Figure 1:
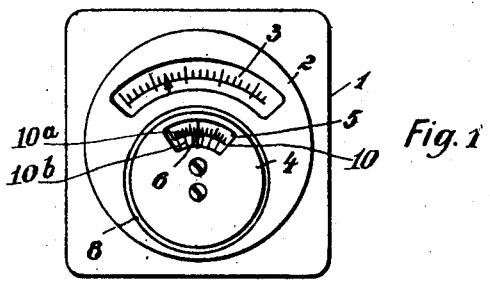

May 3, 1927.

M. MOELLER

MEASURING INSTRUMENT

Filed Sept. 16, 1924

1,627,106

Inventor
Max Moeller
by Knight Bros
attorneys

Patented May 3, 1927.

1,627,106

UNITED STATES PATENT OFFICE.

MAX MOELLER, OF BERLIN, GERMANY, ASSIGNOR TO SIEMENS & HALSKE, AKTIEN-GESELLSCHAFT, OF SIEMENSSTADT, NEAR BERLIN, AND ELSEWHERE, A CORPORATION OF GERMANY.

MEASURING INSTRUMENT.

Application filed September 16, 1924, Serial No. 738,039½, and in Germany April 29, 1924.

My invention relates to improvements in measuring instruments, such as incandescent filament pyrometers. When it is necessary in such instruments to exchange or replace a part, more particularly the incandescent filament of the said pyrometer, it is very inconvenient that the scale must also be exchanged or replaced if the substituted parts cannot be made exactly equal to the parts to be replaced. The exchange of the scale is not desirable because it is then necessary to open the measuring instrument.

The object of my invention is to avoid this drawback.

According to my invention I provide inside the measuring instrument a fixed non-exchangeable scale, the graduation of which is not affected by the exchange of parts and at the outside of the instrument an adjustable and easily exchangeable double scale. One graduation of this double scale coresponds with the graduation of the scale in the interior of the instrument, whilst on the other graduation the corresponding quantity to be ascertained can be read off. If for instance in an incandescent filament pyrometer the non-exchangeable scale is a milli-ampere scale then one of the graduations on the exchangeable scale is also a milli-ampere scale and the other may be a corresponding temperature scale calibrated to the particular substituted element.

In the drawing affixed to this specification and forming part thereof one embodiment of my invention is shown by way of example. The improvement is shown applied to an incandescent filament pyrometer. The drawing represents in—

Figure 2:
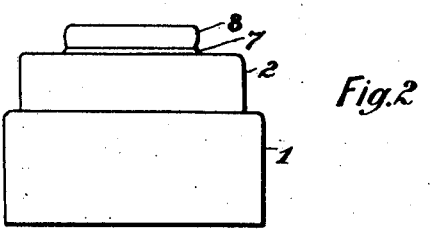
Figure 3:
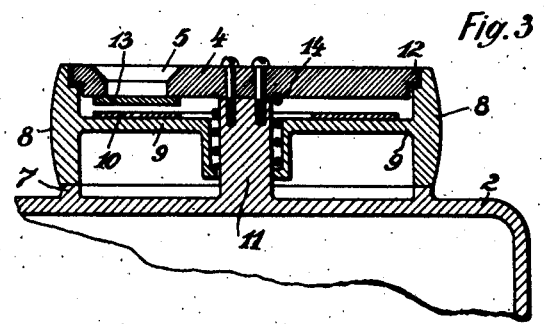
Figure 4:
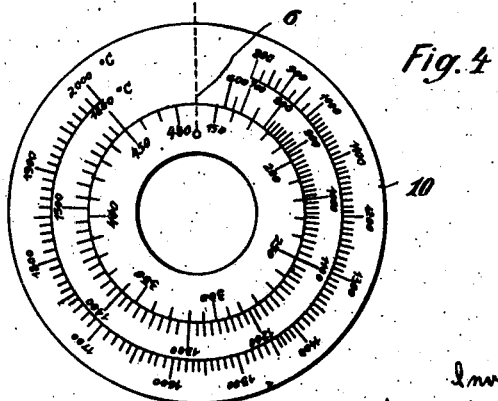

Fig. 1, a diagrammatic plan
Fig. 2, a side-elevation,
Fig. 3, the arrangement of the exchangeable scale in vertical section on an enlarged scale and
Fig. 4 an example of a suitable scale.

Similar parts are indicated by the same reference characters in all the figures of the drawing.

Referring to Figures 1 and 2, 1 is the casing or socket of the pyrometer or other measuring instrument which contains the accessories of a galvanometer 2 mounted upon it and a scale 3 divided according to current intensities. Upon the upper face of the casing is disposed a protective cover 4 for a rotatable double scale 10 which is adapted to be easily exchanged after removal, preferably unscrewing, of the cover 4 without interfering with the measuring instrument. The cover 4 contains a glazed window 5 and in the middle of the window upon the glass pane 13 a fine radial line 6 is drawn. The double scale 10 in the present example is graduated on one side $10^a$ of its base line in current values corresponding to those of scale 3, and on the other side $10^b$ in temperature values to be read on the instrument. This double scale is employed in such a manner that by turning the said double scale 10 the current value indicated by the scale 3 is brought on scale $10^a$ under the line or mark 6. The temperature value to be ascertained is then indicated by the position of the line 6 upon the temperature scale $10^b$. The exchange of this double scale, for instance in case the sensitive elements, such as the filament, are exchanged, can be carried out without an appreciable interruption of the service.

Fig. 3 illustrates the manner of fixing the double scale 10. On the top of the galvanometer casing 2 is provided an annular collar 7 the upper plane face of which serves as running face for the rim 8 of a disk 9 which carries the double scale 10 detachably fixed upon it. The central hub of the disk 9 fits upon a cylindrical boss 11 upon the cover of the casing upon which boss the protective cover 4 for the double scale is fixed in such a manner that it is incapable of rotary motion but can easily be lifted off after withdrawal of the two screws shown. The edge of the cover 4 serves as guide for the rim 8 of the disk 9 when the disk is rotating. In order to impart a certain amount of drag to disk 9 a spring 14 is inserted between the cover 4 and the disk 9 carrying the scale which spring forces the edge of the rim 8 of the disk lightly against the running surface of the collar 7 upon the galvanometer casing 2.

In order to render the readings more accurate the measuring instrument may also be constructed with a plurality of measuring ranges and in correspondence therewith a plurality of scales may be combined with the deflection scale upon the exchangeable scale disk. An example of this construction is illustrated in Fig. 4 for an incandescent filament pyrometer. This figure shows a deflection scale and two temperature scales. The deflection scale calibrated in milliamperes corresponds with the scale 3 in Fig. 1.

It will be understood that the details of construction of the improved measuring instrument may be modified in various ways without departing from the spirit of my invention.

What I claim as my invention and desire to secure by Letters Patent is:—

1. In a measuring instrument of the character described means for reading calibrations on the instrument in values different from normal values, comprising a fixed visible instrument scale containing the normal values, an adjustable double scale removably mounted on the outside of the instrument, one graduation of said double scale corresponding with the graduation in values of the visible fixed instrument scale, the other graduation correspondingly indicating the values different from the normal calibration values of the instrument and to be ascertained by the measurement.

2. A measuring instrument adaptable to indicate measuring values requiring calibrations in values different from those to which the instrument is normally calibrated, comprising a visible scale fixed in the instrument and bearing the normal instrument calibration, and a stationary cover mounted on the outside of the instrument, a rotatable disk disposed below said cover and operable from the disk periphery, a circular removable double scale mounted on said disk, one graduation of said double scale corresponding with the graduation in the normal values of the fixed scale, the other graduation indicating correspondingly the other, different measuring values to be determined by the measurement.

3. In a measuring instrument of the character described means for reading calibrations on the instrument in values different from the normal values, comprising a fixed visible instrument scale containing the normal values, an adjustable scale removably mounted on the outside of the instrument, and having a plurality of graduations, one graduation corresponding with the graduation in values of the normal fixed instrument scale, the other graduations being severally calibrated to correspondingly indicate several different ranges containing values different from the normal calibrations values and to be ascertained by the measurement.

In testimony whereof I affix my signature.

MAX MOELLER.